United States Patent [19]

Eckhardt

[11] Patent Number: 4,543,787
[45] Date of Patent: Oct. 1, 1985

[54] CONTROLS FOR CONTINUOUSLY ADJUSTABLE DRIVE

[75] Inventor: Erich Eckhardt, Gross-Umstadt, Fed. Rep. of Germany

[73] Assignee: Linde Aktiengesellschaft, Wiesbaden, Fed. Rep. of Germany

[21] Appl. No.: 428,260

[22] Filed: Sep. 29, 1982

[30] Foreign Application Priority Data

Nov. 3, 1981 [DE] Fed. Rep. of Germany ....... 3143539

[51] Int. Cl.⁴ .............................................. F16D 31/02
[52] U.S. Cl. ........................................ 60/444; 60/452
[58] Field of Search ................. 60/444, 447, 452, 443, 60/436; 417/216

[56] References Cited

U.S. PATENT DOCUMENTS

| | | | |
|---|---|---|---|
| 3,785,754 | 1/1974 | Miller | 60/444 X |
| 3,854,847 | 12/1974 | Schlecht | 60/444 X |
| 3,884,039 | 5/1975 | Pourian | 60/447 X |
| 3,986,357 | 10/1976 | Hoffmann | 60/447 X |
| 3,987,623 | 10/1976 | Bianchetta | 60/452 X |
| 4,107,924 | 8/1978 | Dezelan | 60/452 X |
| 4,118,931 | 10/1978 | Nonnenmacher et al. | 60/444 |
| 4,405,287 | 9/1983 | Kuchenbecker et al. | 60/447 X |
| 4,463,559 | 8/1984 | Holdenried | 60/444 |

FOREIGN PATENT DOCUMENTS

| | | |
|---|---|---|
| 1030694 | 1/1955 | Fed. Rep. of Germany . |
| 1555480 | 7/1965 | Fed. Rep. of Germany . |
| 1526528 | 1/1966 | Fed. Rep. of Germany . |
| 1780683 | 12/1966 | Fed. Rep. of Germany . |
| 2522719 | 5/1975 | Fed. Rep. of Germany . |
| 2823559 | 5/1978 | Fed. Rep. of Germany . |
| 3007781 | 2/1980 | Fed. Rep. of Germany . |
| 2414665 | 9/1979 | France ................................. 60/444 |
| 19904 | 2/1980 | Japan ................................... 60/444 |

Primary Examiner—Leslie A. Braun
Assistant Examiner—Dwight G. Diehl
Attorney, Agent, or Firm—Buell, Ziesenheim, Beck & Alstadt

[57] ABSTRACT

Control for a continuously adjustable drive, equipped with a signal transmitter arbitrarily actuatable by a manipulation element, in which the conversion setting imposed on the drive is influenced by the position of the manipulation element, in which case an additional r.p.m.-dependent signal is superimposed on the signal emitted by the signal transmitter, at least at excessively small drive r.p.m.'s, where the arbitrarily adjustable signal transmitter preferably is a pressure-regulating valve to which the pressure impounded in front of a restrictor in the delivery line of a constant pump is fed.

7 Claims, 3 Drawing Figures

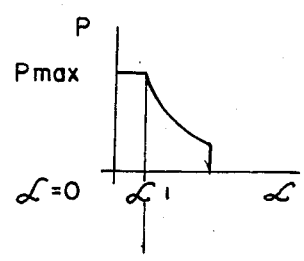
Fig. 2.
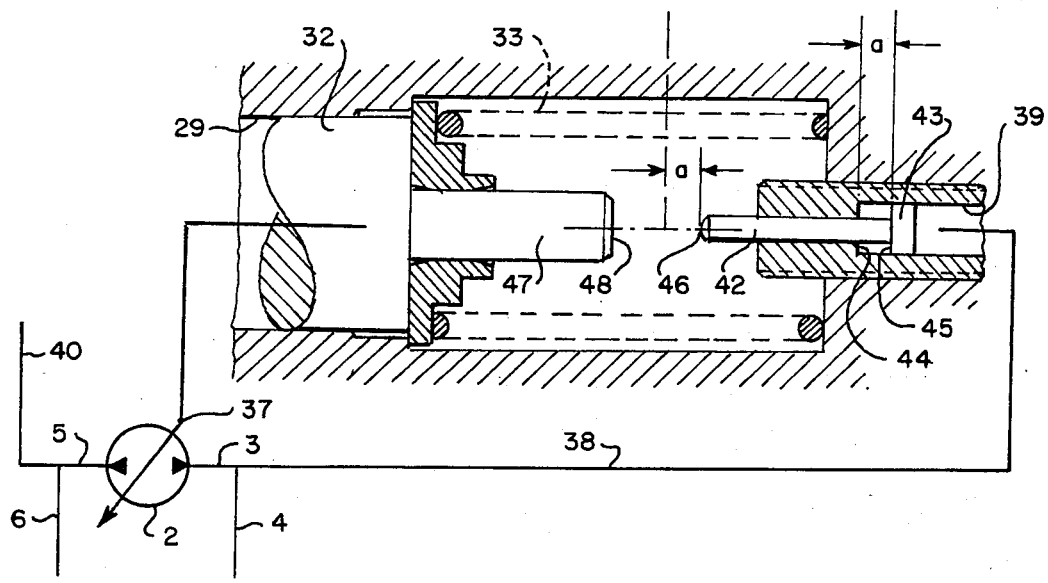
Fig. 3.
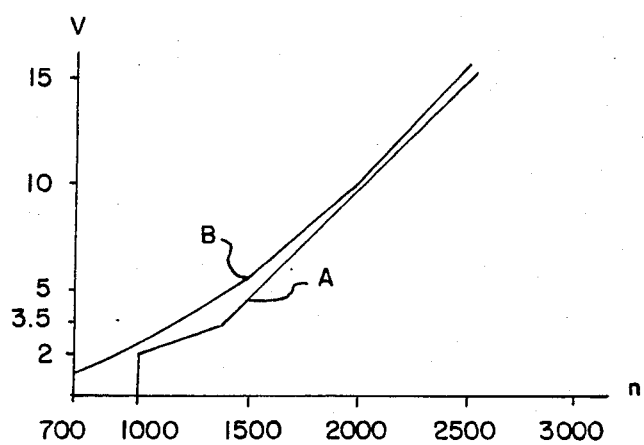

CONTROLS FOR CONTINUOUSLY ADJUSTABLE DRIVE

This invention relates to a control for continuously adjustable drives, and particularly to a control for continuously adjustable hydrostatic drives with an arbitrarily actuable signal transmitter, whose arbitrarily imposed setting controls the adjustment of the drive and which is supplied with energy from an energy source and sends an energy signal to the adjusting mechanism of the drive, in particular, for power-propelled vehicles, and quite specifically, working vehicles such as fork-lifts, tractor-mounted loaders, or the like.

For such vehicles with a hydrostatic drive in the travel mechanism the connecting of the pump of the drive directly with the pedal through a linkage is known, such that the pedal position directly determines the setting of the hydrostatic drive and thus the conversion in it and thus, at a given drive r.p.m., also the speed of travel of the vehicle (DE-PS 10 30 694). Such a control method has proven unusually advantageous, such that stackers equipped with such a control can be driven with very sensitive control even at a slow speed, in which case the speed does not vary with a change in the rolling resistance, e.g., due to uneven ground. Regulation of the internal combustion engine at the same time by this drive adjustment is also known (DE-PS 15 26 528). In a newer state of the art the pedal is no longer connected mechanically with the controlling element of the pump by a linkage, but the controlling element of the pump is connected with an adjusting piston that is capable of sliding in an operating cylinder which in turn is acted upon by a pressure pick-off, which in turn is connected with the arbitrarily actuatable pedal. The same effective results are also obtained here: the pedal position determines the control pressure and thus the position assumed by the adjusting piston, which is capable of sliding against the force of a spring in the operating cylinder, such that here also the setting of the drive is definitively determined by the pedal position and the advantageous control thus results, in which the operator can fine-tune the travelling speed independently of the travel resistance. There is also the additional possibility here of limiting the rate at which the adjusting position of the pedal and thus the adjusting position of the pump can be arbitrarily modified, by incorporating restrictors in the control pressure line.

While the said control method has proved excellent for many applications, especially in fork-lifts, a different control method has proven itself for other purposes, e.g., in tractor-mounted loaders that move into the bulk goods with their shovel, in which the drive adjustment is rendered dependent on the r.p.m. at which the internal-combustion engine drives the hydrostatic drive. For this purpose, the drive shaft of the drive is connected with a constant pump, in the delivery line of which a restrictor is installed, in which case the pressure in front of this restrictor is passed to the operating cylinder of the pump (DE-OS 15 55 480 and DE-OS 17 80 683). This drive control mechanism or controls have the advantage that the internal-combustion engine cannot be brought to a stop by overloading because when its r.p.m. drops, the drive is regulated to a smaller conversion. However, the advantage of the control methods first-mentioned, that the operator can adjust the travel speed directly, is lost since the travel speed varies with the travel resistance.

A control is also already known for a hydrostatic drive in which the drive setting at low travel speeds is determined only by the position of the pedal, and at high travel speeds another operating value additionally determines the conversion ratio (DE-OS 25 22 719).

The present invention proposes a control for a drive, in which the advantages of the aforementioned direct output speed control is optimally combined at a low construction cost with the advantages of a power limiting regulation.

This problem is solved in accordance with the invention by the fact that the energy source for supplying the arbitrarily actuatable signal transmitter is dependent on the running r.p.m. of the drive, such that an r.p.m.-dependent signal is fed to the arbitrarily actuatable signal transmitter since the energy source in turn emits an r.p.m.-dependent signal, in which case this r.p.m.-dependent signal is superimposed on the signal emitted by the signal transmitter for the drive setting, since the signal transmitter cannot increase the signal energy.

The invention refers in particular to a control for an adjustable hydrostatic drive whose controlling element is connected with an adjusting piston capable of sliding in an operating cylinder against the force of a spring, in which case the operating cylinder is loaded with pressure by an arbitrarily actuatable pressure regulating valve supplied by the energy source, namely a pressure-medium source, as the signal transmitter, where according to the invention and with the use of the features known from the aforementioned "automotive control methods" the pressure-medium source is a constant pump driven by the drive shaft of the drive, in the delivery line carrying the feed stream of the said pump a restrictor is installed, where the pressure regulating valve is connected to the delivery line in front of the restrictor, such that a connection in series of an "automotive" control method of the aforementioned type with a "direct control" of the initially mentioned type results. So long as the pressure in the delivery line, impounded in front of the restrictor, reaches the level required so that the pressure beyond the pressure regulating valve, i.e., the signal leaving the pressure regulating valve, precisely matches the setting imparted to the pressure regulating valve by the pedal, this control operates as initially mentioned, very advantageous direct control methods, that is, the drive setting is directly dependent on the pedal position that determines the setting of the pressure regulating valve. However, if the danger of the internal-combustion engine becoming overloaded threatens, its r.p.m. drops and also the delivery stream of the constant pump and also the pressure impounded in this delivery stream in front of the restrictor being fed to the pressure regulating valve. Since the pressure beyond the pressure regulating valve cannot be higher than the pressure in front of it, this has the effect that when the r.p.m. of the primary energy source, e.g., the internal-combustion engine, drops, the pressure fed to the pressure regulating valve and thus the pressure beyond the latter in the operating cylinder drops, such that the controlling element of the pump is displaced through this drop in pressure toward a smaller stroke volume per revolution and thus a smaller power consumption.

Compared with a control for a continuously adjustable hydrostatic drive, in which in the range of low-to-medium output r.p.m.'s the drive setting is determined exclusively by the setting of the arbitrarily actuatable controlling element and only in the range of higher output r.p.m.'s the drive setting, besides by the setting of the controlling element, is determined by an additional operating value, the control according to the invention differs in that within the entire range of setting the advantageous direct control in which the drive setting is determined directly by the setting of the arbitrarily actuatable manipulation element and thus the advantage of delicately sensitive controllability is offered is present, inasmuch as the primary energy source, e.g., internal-combustion engine, is not suppressed so much due to overloading of its r.p.m. that the delivery stream of the constant pump no longer suffices to load the pressure regulator with a pressure that is sufficient to load the operating cylinder with a pressure that adjusts the drive to a high output r.p.m.

The control according to the invention offers the additional advantage that it can be further designed so that a signal that is directly dependent on the torque transmitted to one of the shafts of the drive, e.g., the drive shaft or the output shaft, can be superimposed. In a hydrostatic drive an additional piston loaded by the pressure in the line of the hydrostatic drive that carries the delivery pressure can act for this purpose to effect a displacement of the adjusting piston for a smaller output r.p.m. setting of the hydrostatic drive. The action of an additional piston on the adjusting piston is in itself already known in the case of a hydrostatic drive whose adjusting piston is loaded by the pressure in front of a restrictor (DE-OS 28 23 559). When this familiar feature is used in a control according to the invention, a signal that is directly dependent on the r.p.m. is thus superimposed here on the r.p.m.-dependent (indirectly by the torque load at the drive shaft of the drive, but possibly also dependent on additional loads acting on the primary energy source) signal.

In this case it can be particularly expedient if the superimposition of the r.p.m.-dependent signal is possible only within a certain adjustment range of the drive. In a hydrostatic drive with an additional piston this can be effected by providing or connecting the additional piston with a stop that restricts the displacement path of the additional piston such that with small displacement paths of the adjusting piston from the neutral position the active surface of the additional piston provided for working together with the adjusting piston is separated from the latter, such that the additional piston lies against the adjusting piston and is thus in operating connection with it only if the adjusting piston and thus the controlling element is displaced by a certain amount from the neutral position correlated with stoppage of the output shaft of the drive. This limitation can be advantageous because when a hydrostatic drive is set to small output r.p.m.'s, it absorbs only a low power due to the small output r.p.m. even if the maximum output torque is delivered and thus the maximum feed pressure prevails in the hydrostatic drive (see the statements in *Fundamentals of a Hydrostatic Drive - Construction, Mode of Operation, and Special Applications* in "Linde Reports from Technology and Science", No. 42, 1977, p. 29, in particular, p. 51). Only with a setting to higher output r.p.m.'s can the drive absorb the full power of the primary energy source, in which case it can be expedient in this range to render the drive setting of the torque absorbed at the pump shaft dependent on the feed pressure. In a constant motor the feed pressure is proportional to the torque, while in an adjustable pump or motor the ratio between pressure and torque is also dependent on the setting. The advantage of "direct" control is also retained insofar as possible in this further refinement of the invention and this direct control, in which the drive setting is directly dependent on the setting of the arbitrarily actuatable manipulation element, is overridden only if the danger of overloading threatens. An effect that is similar and at least equivalent to the familiar maximum-load regulations thus results. The familiar "automotive" control methods have the additional disadvantage that if the r.p.m. of the internal-combustion engine must be arbitrarily increased in order to actuate an additional drive, e.g., the hydraulic lift system in a forklift, the travel drive is also influenced. This disadvantageous influence is also eliminated in the control according to the invention.

According to a particularly advantageous additional feature of the invention, a pressure-limiting valve is installed in the delivery line of the constant pump driven by the input shaft of the drive between the connection point of the line leading to the pressure-regulating valve at this delivery line and the restrictor in this delivery line. Due to the fact that this pressure-limiting valve is connected in series with the restrictor, an addition of the constant pressure gradient produced by the pressure-limiting valve and which is at least approximately independent of the stream to the pressure gradient produced by the restrictor, quadratic with the stream, and thus increasing with the r.p.m. (known from DE-OS 30 07 781) results. The total pressure beyond the constant pump and thus the pressure fed to the arbitrarily actuatable pressure-regulating valve is thus raised to such a value that by an arbitrary adjustment of the pressure-regulating valve beyond it any pressure that is required to displace the adjusting piston in the operating cylinder to any desired position can be set; however, this is true only so long as the r.p.m. of the drive shaft of the drive is sufficiently high so that the delivery stream of the constant pump can generate the pressure required. If the delivery stream drops due to suppression of the r.p.m. of the primary energy source, in particular, the internal-combustion engine, the pressure fed to the pressure-regulating valve and thus the maximum pressure that can beset beyond the pressure-regulating valve also drop. On the other hand, the effect is obtained by the familiar interposing of the pressure-limiting valve that the signal emitted when the r.p.m. drops is also very clear.

The choice of the diameter of the additional piston loaded by high pressure, relative to the diameter of the adjusting piston and the design of the spring against which the adjusting piston rests can be assumed from the type of application, such that the most favorable prerequisites for the superimposition can be achieved within the frame of the considerations familiar to the technician on the basis of the requirements arising in each type of application.

The acceleration and braking behavior can be optimized by the arrangement according to the invention.

In the foregoing general description of this invention certain objects, purposes and advantages of the invention have been set out. Other objects, purposes and advantages of this invention will be apparent from a consideration of the following description and the accompanying drawings in which:

FIG. 2 shows a cut through the operating cylinder with the insertion of the cylinder for the additional piston; and FIG. 3 shows an action diagram.

Figure 1:
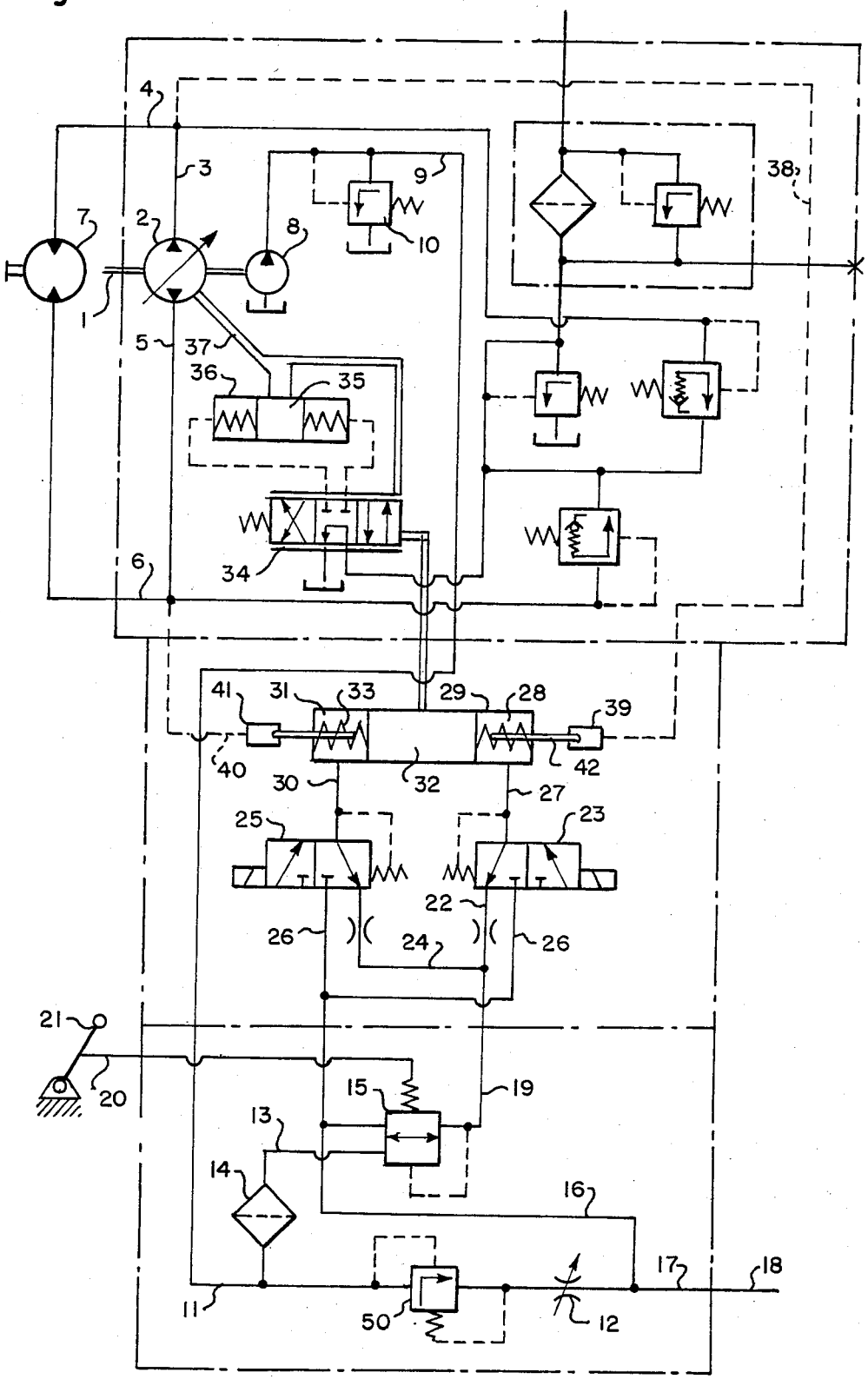
FIG. 1 shows a circuit diagram.

The pump 2 is driven through the shaft 1 by the primary energy source (not shown). The pump 2 is connected through lines 3 and 4 and also through lines 5 and 6, with the hydraulic motor 7 in a closed circuit to a drive. The constant pump 8 is also driven by shaft 1; it feeds into a delivery line 9, which is protected by a pressure-limiting valve 10 and is connected to a line 11 that leads to a restrictor 12. The line 13 is connected to the delivery line 11 in front of the restrictor 12. A filter 14 can be installed in line 13, in which case the line 13 leads to an arbitrarily actual signal transmitter such as the pressure-regulating valve 15, which on the other hand is acted upon through the line 16 by the pressure in line 17 beyond the restrictor 12, in which case line 17 leads to a drain connection 18. The pressure in line 19 is determined by the setting of the pressure-regulating valve 15. The setting of pressure-regulating valve 15 is determined through a linkage 20 by the arbitrarily actuatable manipulation element 21 designed as a pedal. Line 19 branches into line 22, which leads to the arbitrarily actuatable multiway acting valve 23, and line 24, which leads to the arbitrarily actuatable multiway valve 25, in which case the direction of rotation is determined at the output shaft of the hydraulic motor 7 by arbitrarily regulating one of the two multiway valves 23 and 25. The connection 26 of each of the two multiway valves 23 and 25 is connected with the line 16. A line 27 leads from the multiway valve 23 to the pressure chamber 28 in the operating cylinder 29. A line 30 leads from the multiway valve 25 to the pressure chamber 31 of the operating cylinder 29, in which the adjusting piston 32 is capable of sliding between two springs 33. The adjusting piston 32 acts as a pilot piston indirectly through the servo valve 34 on a control pressure transmitter such as the working adjusting piston 35 in the working operating cylinder 36, which in turn is also tensioned between two springs, on the controlling element 37 of pump 2.

A high-pressure control line 38, which leads to a high-pressure modulating cylinder 39, is connected to the delivery line 3. In the same manner, a high-pressure control line 40, which leads to a high-pressure modulating cylinder 41, is connected to the delivery line 5. An additional piston 42 is capable of sliding in each of the high-pressure modulating cylinders 39 and 41; this piston 42 has a stop head 43 at its cylinder-side end that can be moved with its stop surface 45 against a stop collar 44 in cylinder 39 or in cylinder 41. The length of the additional piston 42 is attuned to the position of the stop shoulder 44 so that if the stop head 43 lies with its stop surface 45 against the stop shoulder 44, the effective surface 46 of the additional piston 42 reaches the position indicated in FIG. 2 by the dashed line 47.

Thus, the additional piston 42 is shown in FIG. 2 in a position that is shifted by the extent "a" to the right as compared with the position in which the stop head 43 lies against the stop shoulder 44. The adjusting piston 32 is provided with a prolongation 47, against whose end surface 48 the effective surface 46 of the additional piston 42 comes to lie as soon as the adjusting piston 32 has moved far enough to the right in FIG. 2 with compression of the spring 33 so that the end surface 48 of the prolongation 47 of the adjusting piston 32 has reached the position indicated in FIG. 2 by the line 47. This position is advantageously selected so that in this position the pump 2 has reached approximately one-third of the maximum possible deviation. That is, if the pump 2 is in the zero-stroke position or deviated less than up to the angle $\alpha_1$, the high pressure standing in the delivery lines 3, 4 or 5, 6 cannot exert an effect on the position of the adjusting piston 32. The maximum permissible delivery pressure can be invariably reached within this range without the danger of the primary energy source becoming overloaded, since due to the slight deviation of the pump, i.e., the setting of the pump to a low stroke volume, the latter absorbs only a slight torque. Only with a deviation to the angle $\alpha_1$ does the product of the maximum delivery pressure and delivery stream attain a power that matches the maximum power obtainable from the primary energy source, such that from this degree of deviation on the adjusting piston 32 must be returned toward the zero-stroke position of pump 2 if the maximum pressure is reached. Thus, if a vehicle travels with such a drive at low speeds, sudden changes in the load and the resulting high pressures in the hydrostatic drive, such as a rise in hitting a curb edge, for example, do not influence the drive setting. A high-pressure influence is however involved at greater deviations to a greater stroke volume and thus at greater torques at the shaft.

A pressure-limiting valve 50 is installed in the delivery line 11 in front of the restrictor 12; it is influenced by the pressure in front of and beyond this pressure-limiting valve 50.

The control pressure acting on the adjusting piston 32 and thus the travel speed is plotted over the r.p.m. of the shaft 1 in FIG. 3. Curve A here shows the characteristic at which only the pressure-regulating valve is influenced by the manipulation element 21, while the curve B plots the characteristic at which the r.p.m. of the driving engine is also considered by the signal fed to the pressure-regulating valve 15.

In the foregoing specification I have set out certain preferred practices and embodiments of this invention, however, it will be understood that this invention may be otherwise embodied within the scope of the following claims.

I claim:

1. In a control system for a continuously adjustable hydrostatic drive for a power propelled vehicle having a plurality of driven shafts, a variable source 2 of fluid energy driven by a primary energy source in the vehicle, a constant source 8 of fluid energy driven by the primary energy source in series with the variable source of fluid energy, a fluid drive 7 connected to a driven shaft and receiving drive fluid from the variable source, a fluid controlled adjusting mechanism 29, 34, 35 connected to and varying the variable source of fluid energy, and including operating cylinder 29 acting on a servo valve 34 and an arbitrarily variable direction control means 23, 25 fluid connected to said operator cylinder 29, the improvement comprising a fluid line 11 receiving pressure fluid from the constant source of fluid energy, a variable restrictor in said fluid line, an arbitrarily actuable pressure regulating valve 15 connected to the fluid line 11 between the constant source of fluid energy 8 and the variable restrictor 12 and receiving pressure fluid therefrom, connectors 19, 22, 24 from said arbitrarily actuable pressure regulating valve 15 to said arbitrarily actuable direction control means 23, 25 and a connection from said arbitrarily actuable direction control means and the fluid line 11 on the opposite side of the variable restrictor 12 from said pressure regulating valve 15 whereby the variable source 2 of fluid energy is at least partly controlled by the fluid pressure regulating valve 15.

2. Control according to claim 1, characterized in that a pressure-limiting valve 50 is installed in the delivery line 11 of the constant pump 8 between the point of connection of the line 13 leading to the pressure regulating valve 15 and the restrictor 12.

3. Control according to claim 1, characterized in that said drive has a plurality of shafts and a signal dependent on the torque transmitted to one of the shafts of the drive is superimposed on the signal coming from the arbitrarily actuable pressure regulating valve 15, through an adjusting piston 32 in the operating cylinder 29.

4. Control according to claim 3, characterized in that the superimposition of the r.p.m.-dependent signal is facilitated only within a certain adjustment range of the drive.

5. Control according to claim 4, characterized in that said additional piston 42 is connected with a stop 43, 45 which limits the displacement path of the additional piston 42 such that in the case of small displacement paths of the adjusting piston 32 from the neutral position the working surface of the additional piston, designed to work together with the adjusting piston is separated from the corresponding working surface 48 of the adjusting piston.

6. Control according to claim 3, characterized in that an additional piston 42 loaded by the pressure in the line 3, 4 or 5, 6 carrying the drive feed pressure of the hydrostatic drive also acts on an adjusting piston 32 in the direction of a shift to adjusting the hydrostatic drive to a smaller output r.p.m.

7. Control according to claim 6, characterized in that said additional piston is connected with a stop which limits the displacement path of the additional piston such that in the case of small displacement paths of the adjusting piston from the neutral position the working surface of the additional piston, designed to work together with the adjusting piston is separated from the corresponding working surface of the adjusting piston.

* * * * *